United States Patent [19]

Yamanishi

[11] Patent Number: 4,975,788
[45] Date of Patent: Dec. 4, 1990

[54] VIDEO SIGNAL SKEW CORRECTOR

[75] Inventor: Kazuhiro Yamanishi, Kashiwara, Japan

[73] Assignee: Matsushita Electrical Industrial Co., Ltd., Osaka, Japan

[21] Appl. No.: 200,372

[22] Filed: May 31, 1988

[51] Int. Cl.⁵ .............................................. H04N 5/78
[52] U.S. Cl. ................................. 360/10.1; 360/10.2; 360/36.2; 358/327; 358/340
[58] Field of Search ................. 360/10.1, 10.2, 10.3, 360/18, 26, 36.1, 36.2, 76; 358/312, 320, 327, 337, 339, 340

[56] References Cited

U.S. PATENT DOCUMENTS

| | | |
|---|---|---|
| 4,159,480 | 6/1979 | Tachi ................................. 360/18 X |
| 4,499,507 | 2/1985 | Yamada et al. ....................... 360/26 |
| 4,688,111 | 8/1987 | Kani .................................. 360/36.2 |
| 4,733,312 | 3/1988 | Morimoto ...................... 360/36.2 X |
| 4,772,950 | 9/1988 | Furuhata et al. ............. 360/36.1 X |
| 4,788,604 | 11/1988 | Takeuchi ........................... 360/10.3 |
| 4,796,123 | 1/1989 | Takeuchi et al. ............. 360/10.3 X |

Primary Examiner—Aristotelis M. Psitos
Attorney, Agent, or Firm—Wenderoth, Lind & Ponack

[57] ABSTRACT

A read address and a write address are rendered coincident to each other and, by the use of a read modify write cycle, an address representing a write picture start point is held in a register. The start point held in the register is utilized as a read start address, whereby skew can be corrected without the necessity of increasing the number of required memories.

4 Claims, 9 Drawing Sheets

VIDEO SIGNAL SKEW CORRECTOR

BACKGROUND OF THE INVENTION

1. Field of the Invention

The present invention relates to an apparatus for correcting skew caused during slow-motion reproduction in a video cassette recorder or the like.

2. Description of the Prior Art

In the conventional skew correctors known heretofore, it is customary that memory write and read cycles are executed alternately with an address counter reset at each picture start point in such a manner that a write address corresponds to an input signal, and a read operation is performed periodically regardless of such reset to consequently correct the skew.

In such conventional skew correctors where individual addresses are needed for write and read respectively, it follows that normal write and read cycles are individually necessary for the memory write and read. Accordingly the time required for memory write and read cycles is rendered twice that as compared with the execution of write or read alone, hence necessitating twice the number of parallel data lines for data converted by a serial-parallel conversion circuit in case the sampling period is shorter than the memory write or read cycle time. Thus, the number of required memories is doubled eventually.

FIG. 9 shows a serial-parallel conversion circuit employed in a conventional skew corrector, and FIG. 10 is a timing chart showing waveforms of signals in the circuit of FIG. 9. The reference symbols representing such waveforms correspond to those used in FIG. 9.

The operation of such a circuit is performed in the following manner. First, a video signal fed via an input terminal 10 is quantized and sampled by an A/D converter 30. FIG. 10 shows an exemplary case where the sampling frequency is three times the write or read cycle. Subsequently the data DI quantized by the A/D converter 30 are converted into six parallel data by eleven D flip-flops (DFFs) 32 responsive to six phase-shifted clock pulses $\phi 11-\phi 16$. The parallel data Q11 thus obtained are written in six memories 1 . . . during the low level state of a signal RW.

The signal RW serves to selectively switch read and write cycles in such a manner that its high level and low level correspond respectively to a read cycle and a write cycle. During the high level state of the signal RW, the data are read out from the memories 17 as M11 and are once held in six DFFs 33 as Q12. Subsequently the data Q12 are processed to resume the original sampling frequency by six tri-state buffers 34 responsive to clock pulses $\phi 11-\phi 16$ to obtain a serial data DO. The data DO is converted into a video signal by a D/A converter 31, and the video signal is outputted from an output terminal 11.

In such known serial-parallel conversion circuit, a total of six memories 17 are required whereas the sampling frequency is three times as high as the write or read cycle.

SUMMARY OF THE INVENTION

An object of the present invention resides in providing an improved skew corrector which can be constituted without the necessity of increasing the number of required memories by using a read modify write cycle with a read address and a write address rendered mutually coincident and reading out data while changing the read start address.

To achieve this object, a skew corrector of the present invention comprises a memory unit for storing therein N pieces of data obtained by quantizing an input video signal in one field, a first counter for periodically counting up to N to produce sequential addresses of the memory unit, a start pulse generator for generating a start pulse representative of a start point of one picture when the N pieces of data are written in the memory unit, a hold circuit for holding an output value of the first counter in response to the start pulse, and a second counter for generating a pulse each time after counting N pieces of data, wherein the output value of the hold circuit is set in the first counter in response to the output pulse of the second counter.

Due to the constitution mentioned above, the data representing the read start point is utilized for the picture start point of the written video signal so that the sync signal interval is maintained properly without any disorder to consequently attain correction of the skew. Furthermore, since the write address is rendered coincident with the read address, it becomes possible to employ a read modify write cycle for execution of fast read and write with the same address continuously. Therefore the total time of each read and write operation is reducible to be substantially equal to the time of one normal write or read operation, hence averting an increase of the number of memories required.

According to the present invention, as described above, skew can be corrected in a simplified constitution without increasing the number of memories to eventually attain significant advantages in practical use.

DESCRIPTION OF THE PREFERRED EMBODIMENTS

Figure 1:
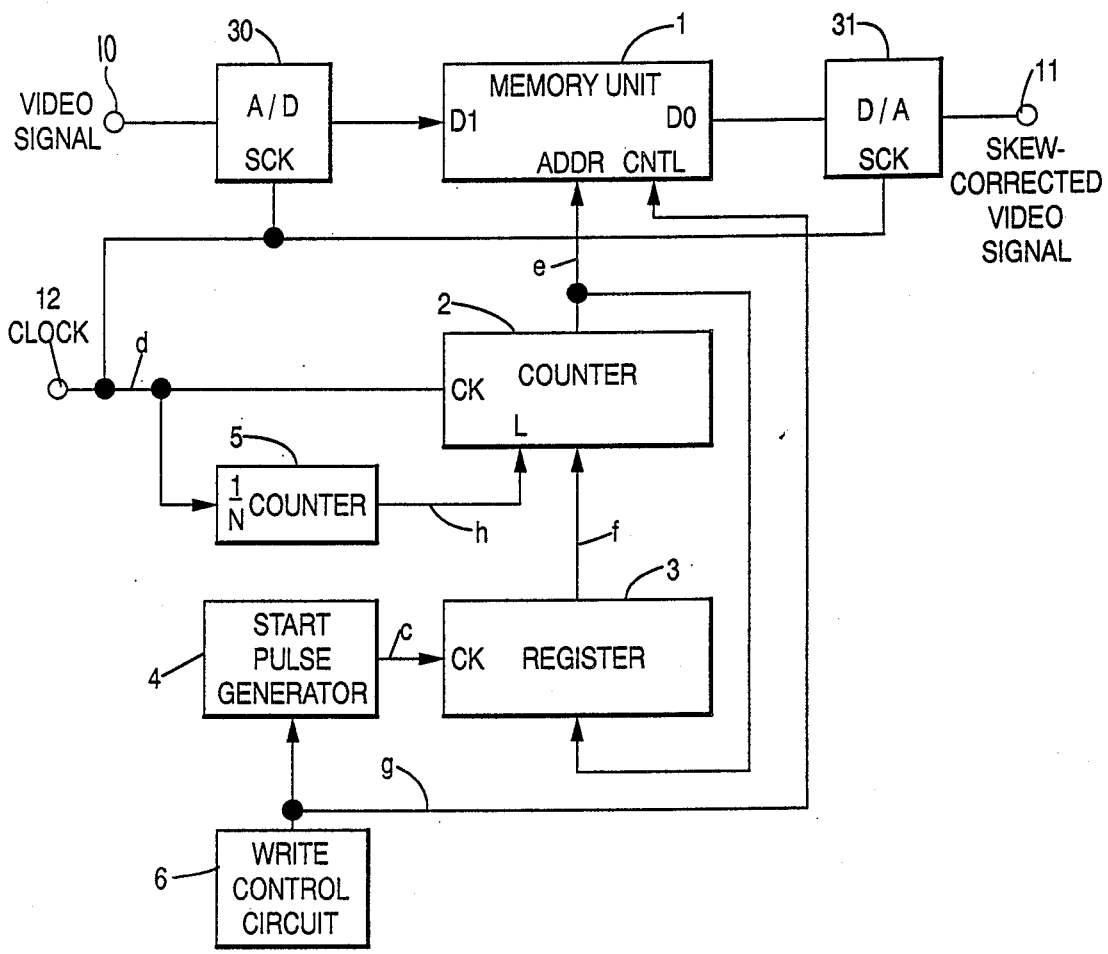
FIG. 1 is a block diagram of a preferred embodiment of the present invention.

FIG. 1 is a block diagram of a first embodiment according to the present invention. In the diagram, there is shown a memory unit 1, a first counter 2, a register 3 a start pulse generator 4, and a second counter 5. An output e of the first counter 2 is fed as an address input to the memory unit 1, and is also fed to the register 3, whose output is then fed as a preset input to the first counter 2. The first counter 2 is incremented one by one in accordance with the pulses obtained from a clock input terminal 12, and the preset input value is loaded in the first counter 2 by each output pulse of the second counter 5 produced in response to N pulses corresponding to the data of one field.

The start pulse generator 4 produces a pulse which represents a picture start point selected by the output of a write control circuit 6. This output pulse is applied as a clock input to the register 3, and the output value of the first counter 2 is loaded in the register 3 synchronously with such the clock input.

A video signal reproduced from a video tape by a video head and subjected to necessary processing such as frequency demodulation is fed to an input terminal 10. The video signal is converted by a A/D converter 30 to a digital data.

The output data from the A/D converter 30 is written in the memory unit 1 in accordance with the output of the write control circuit 6. The data in the memory unit 1 is read out therefrom and converted by a D/A converter 31 to an analog video signal, which is obtained at an output terminal 11.

Such operations will now be described below in further detail with reference to the timing chart of FIG. 2, which represents the operational timing in a slow-motion reproduction mode executed at ¼ speed.

In this timing chart, a denotes an input video signal illustrated typically to attain easy understanding with respect to the composition of a picture. The left end and the right end of each partition correspond to the upper end and the lower end of each picture, respectively. The occurrence of skew in a portion S is exaggerated in the illustration. Since the skew is derived from disorder of the phase with the period remaining unchanged in regard to the lapse of time, the phase deviation is expressed on an enlarged scale.

Denoted by b is a pulse representing a picture start point, and c denotes a pulse representing a picture start point in a write state. This pulse c is an output of the start pulse generator 4 shown in FIG. 1.

There are also shown clock pulses d supplied per data via the clock input terminal 12, and e represents the output value of the first counter 2 in an analog form, wherein the minimum level corresponds to an output value 0 and the maximum level to a value N−1.

Denoted by $n_0$-$n_4$ are preset values, and the output of the register 3 is preset in response to each output pulse of the second counter 5. An output f of the register 3 is renewed by each pulse c representing the picture start point.

Denoted by g is a write permit signal outputted from the write control circuit 6. During a high level of signal g, the output data of the A/D converter 30 are written sequentially in the memory unit 1. An output pulse h of the second counter 5 is produced each time when N pulses of the clock pulses d have been counted, so that the pulses h thus produced have a fixed period. This pulse h serves to preset the written picture start point in the first counter 2, whereby the read start point is always kept coincident with the written picture start point. In a slow-motion reproduction mode, the length of one picture becomes an integral multiple (264 in VHS system) of the horizontal synchronizing signal, so that the output video signal is retained free from any skew as represented by i.

Figure 3A:
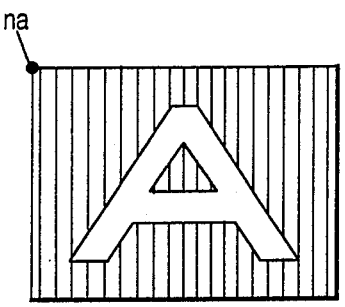
FIGS. 3(a)–(c) illustrate read and write state of the embodiment shown in FIG. 1.
Figure 3B:
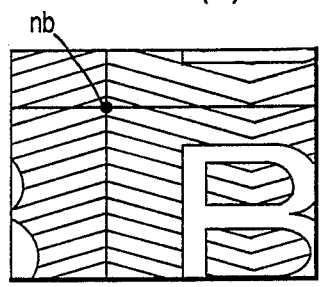

This operation will be described in further detail with reference to FIGS. 3(a)-(c) which are plan views of the memory content corresponding to one picture. FIG. 3(a) shows the memory content read out with a start value na. The data of one picture is written when a write field arrives in this stage, but due to the existence of skew, generally the data is written with a deviation as illustrated in FIG. 3(b). It is a matter of course that even in this write state, the read data is such as represented by FIG. 3(a).

Figure 3C:
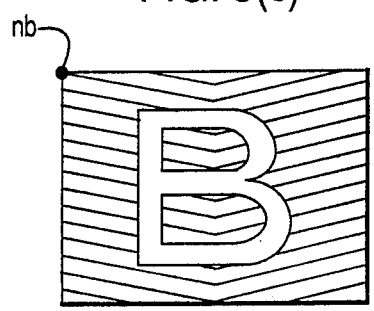

In the next field, a start value nb representing the start point of a picture B is held in the register, so that the data is read out on the basis of such a start value to consequently obtain FIG. 3(c), hence averting occurrence of any skew.

Thus, even if the video signal is written with a temporal deviation from the video signal read out, the address is also deviated correspondingly thereto before reading the written signal, so that no skew is eventually caused.

Figure 2:
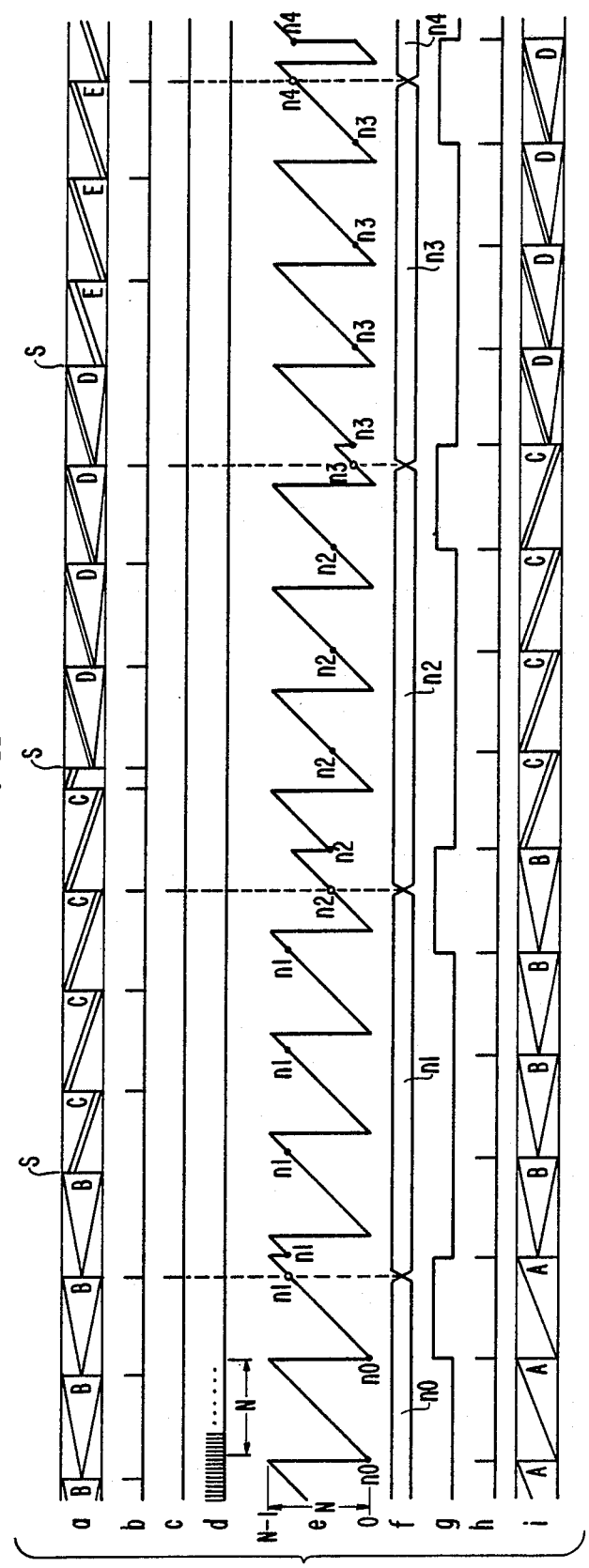
FIG. 2 is a timing chart of the operation of the embodiment shown in FIG. 1.

Although in FIG. 2 the signal is written synchronously with the read cycle, the same result is attainable if the write is executed in synchronism with the write signal.

Figure 4A:
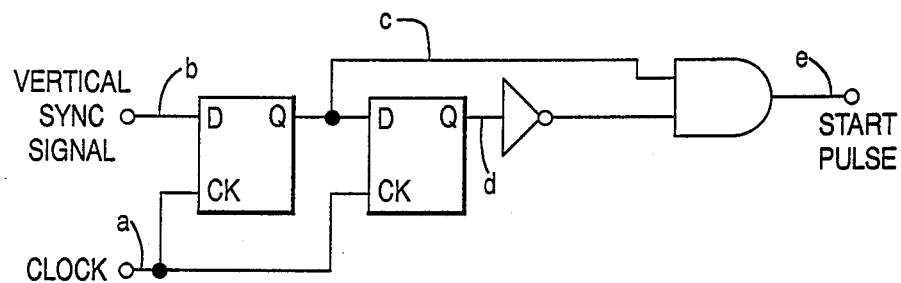
FIGS. 4(a)–(b) and 5(a)–(b) are block diagrams of exemplary start pulse generators and timing charts thereof.
Figure 4B:
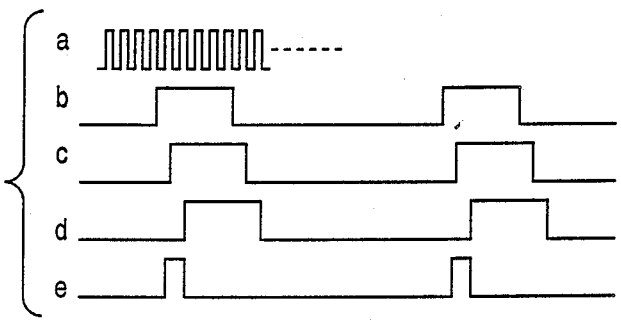
Figure 5A:
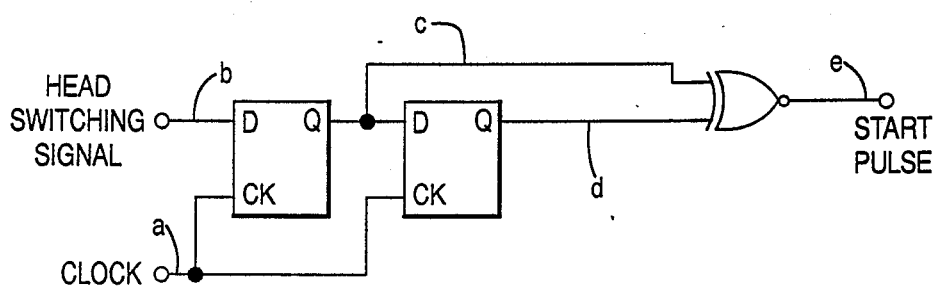
Figure 5B:
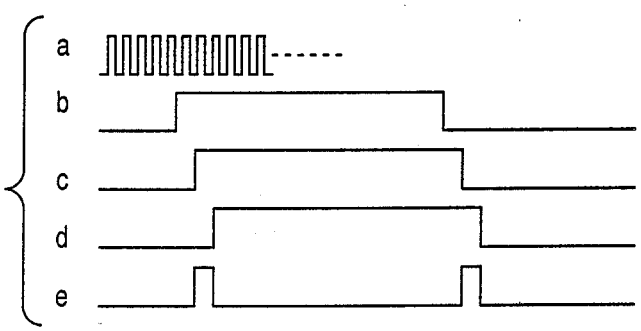

As for the generation of a start pulse, the circuit configuration may be such as shown in FIG. 4(a) and FIG. 4(b) to produce a desired pulse from a vertical synchronizing signal included in the input video signal or, in the case of a reproduced signal in a VCR, such as shown in FIG. 5(a) and FIG. 5(b) to produce a desired pulse from a rotary-head switching signal.

Figure 6:
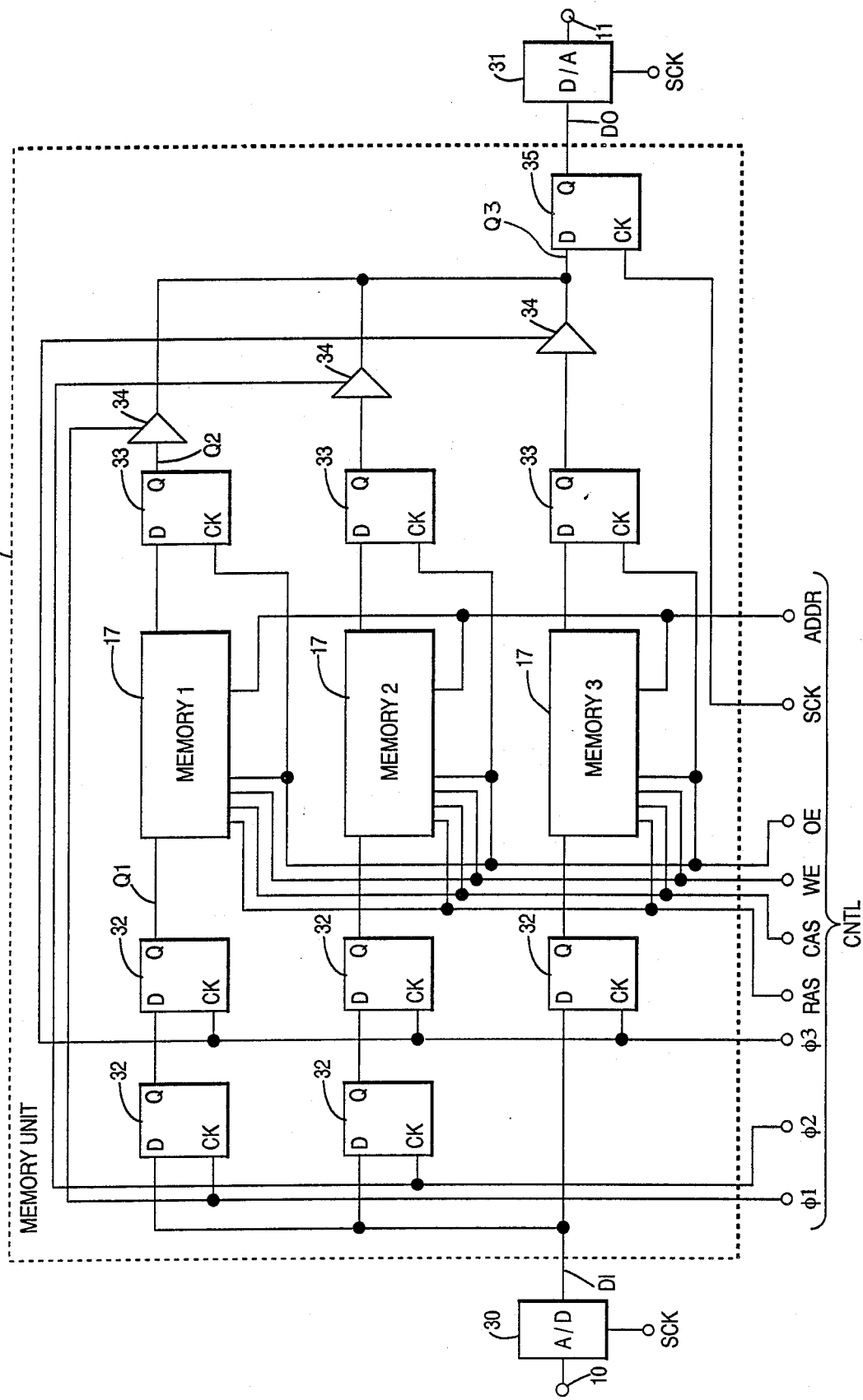
FIG. 6 is a block diagram of an exemplary serial-parallel conversion circuit employed in the present invention.
Figure 7:
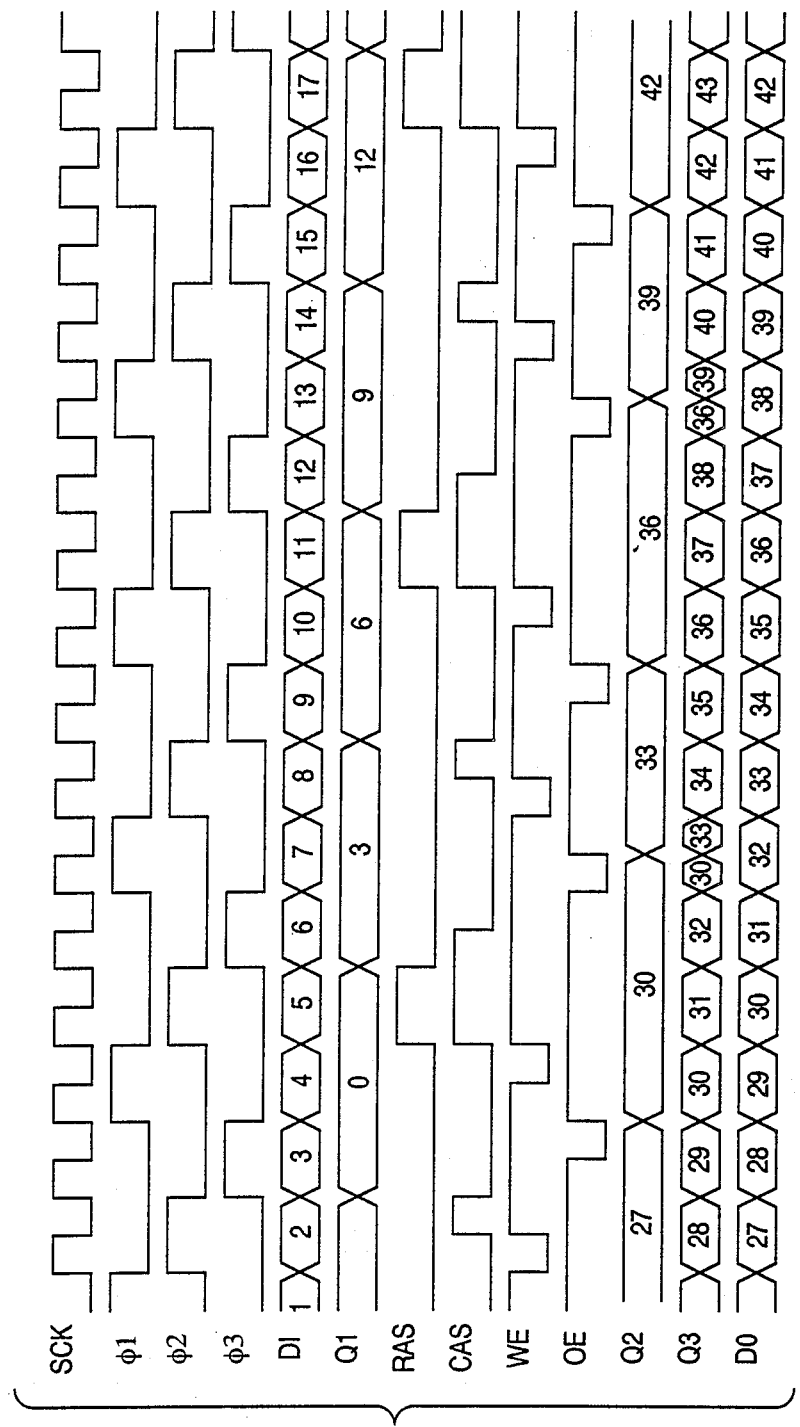
FIG. 7 is a waveform chart of the circuit shown in FIG. 6.

The serial-parallel conversion circuit, i.e., memory unit 1, in the present invention is so constituted as shown in FIG. 6, and the waveforms of signals produced therein are shown in a timing chart of FIG. 7. The reference symbols denoting the waveforms in FIG. 7 correspond to those shown in FIG. 6.

Figure 10:
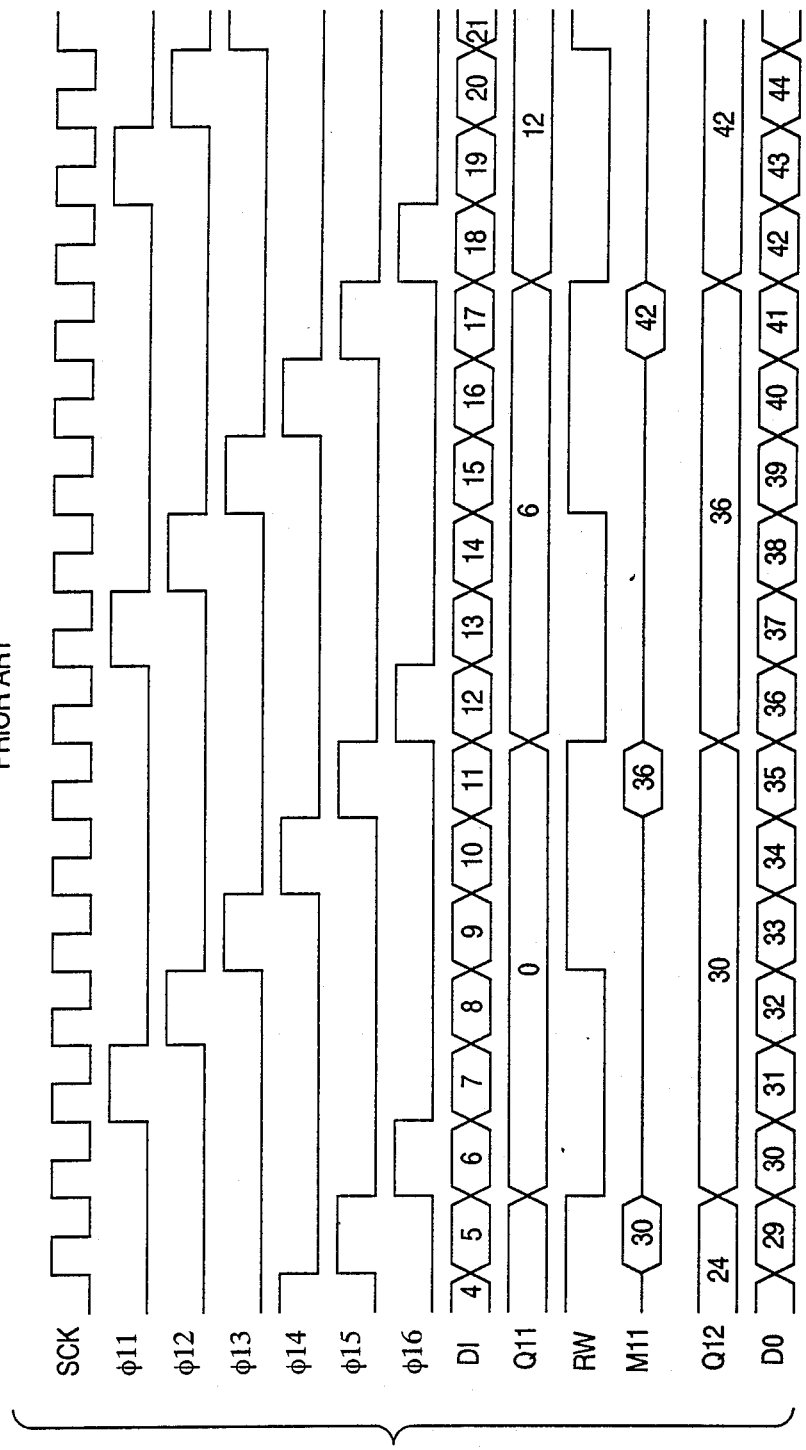
FIG. 10 is a waveform chart of the circuit shown in FIG. 9.

FIG. 7 represents the operational timing with the use of a page mode read modify write cycle. First, a video signal fed via the input terminal 10 is quantized and sampled by the A/D converter 30. In the example of FIG. 7, as in the aforementioned case of FIG. 10, the sampling frequency is three times as high as the write or read cycle. Subsequently the data DI quantized in the A/D converter 30 are converted into three parallel data by five DFFs 32 responsive to three phase-shifted clock pulses $\phi 1$-$\phi 3$. The parallel data QI thus obtained are written in the memory unit 1 during the low level of a signal WE. Meanwhile, during the low level of a signal OE, the data are read out from the memory unit 1 and are once held in the three DFFs 33 as Q2. Then the data Q2 are processed to resume the original sampling frequency by three tri-state buffers 34 responsive to clock pulses $\phi 1$-$\phi 3$ to become data Q3, and the data Q3 are arranged by a DFF 35 to obtain serial data DO. After subsequent conversion of the data into a video signal by the D/A converter 31, the signal is outputted from the output terminal 11.

Figure 8A:
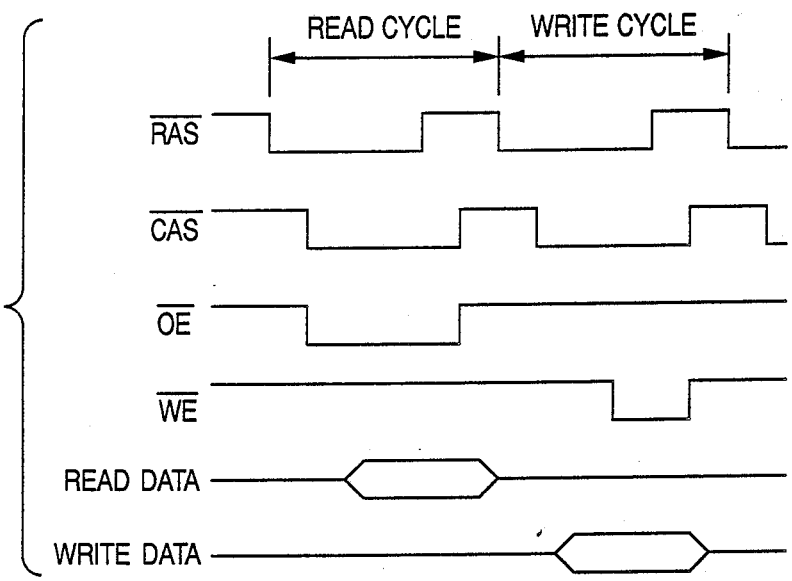
FIGS. 8(a)–(b) are a timing charts of normal read and write cycles and a read modify write cycle.
Figure 8B:
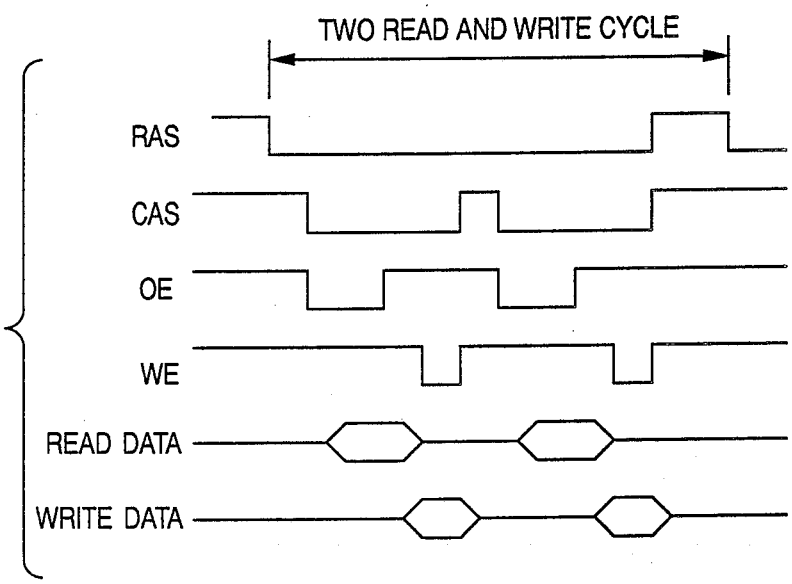

FIGS. 8(a) and 8(b) show a comparison of normal read and write cycles FIG. 8(a) with a read modify write cycle FIG. 8(b). As will be understood from FIGS. 8(a) and 8(b) a read and write operation in such a read modify write cycle can be performed during the same time as needed for reading and writing one data in the normal cycles.

Figure 9:
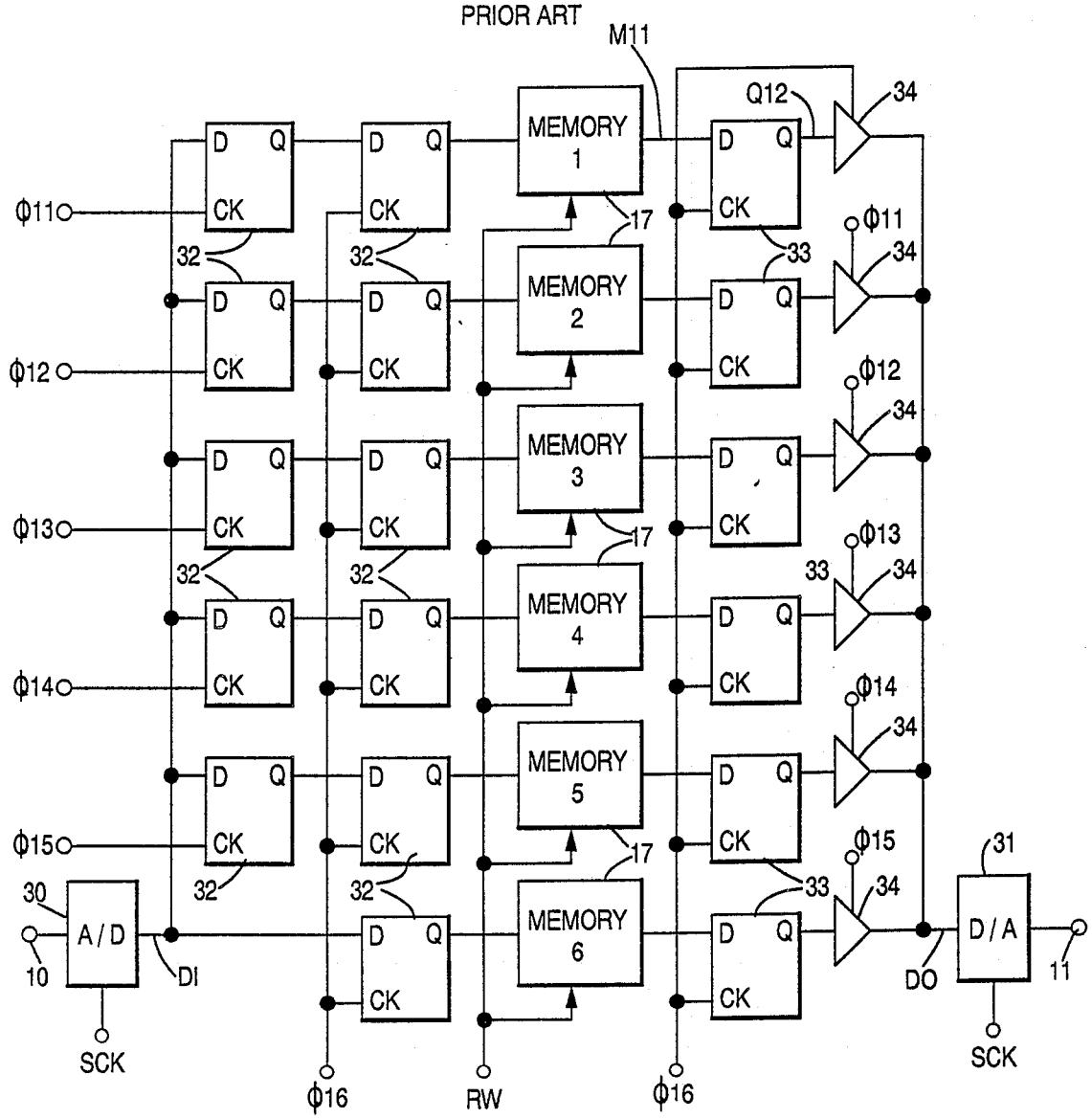
FIG. 9 is a block diagram of a conventional serial-parallel conversion circuit.

Accordingly, as shown in FIG. 6, the number of required memories can be reduced to three which is one half of the number required in the circuit of FIG. 9.

What is claimed is:

1. A skew corrector for correcting a skew of a video signal, comprising:

analog to digital converting means responsive to an input clock signal for converting each field of an input video signal to N pieces of digital data;

memory means for storing therein N pieces of digital data;

control means for controlling said memory means to consecutively write digital data outputted from said analog to digital converting means into said memory means and to consecutively read the thus written digital data from said memory means;

digital to analog converting means responsive to said input clock signal for converting the digital data read from said memory means to an analog video signal;

a first counter means which is a presettable counter for periodically counting N clock pulses of said input clock signal from a preset value and for outputting a corresponding count value as an address data to said memory means;

start pulse generating means controlled by said control means for generating a start pulse representing a picture start point of said input video signal when said memory means is in a data write mode;

holding means responsive to said start pulse for holding a count value of said first counter; and a second counter for periodically counting N clock pulses of said input clock signal and for outputting a pulse signal each time N clock pulses have been counted, said first counter being responsive to said pulse signal outputted from said second counter for presetting the count value held by said holding means as said preset value, whereby the output video signal of said digital analog converting means becomes a skew corrected video signal.

2. A skew corrector according to claim 1, said control means includes means for controlling said memory means to perform a read modify write cycle operation during each occurrence of said address data.

3. A skew corrector according to claim 1, said start pulse generating means includes means for generating said start pulse from each vertical synchronizing signal of the input video signal.

4. A skew corrector according to claim 1, wherein the input video signal is a reproduced signal of a video cassette recorder, and said start pulse generating means includes means for generating said start pulse from a rotary-head switching signal produced in said video cassette recorder.

* * * * *